(12) United States Patent
Tjutjunnik (10) Patent No.: US 8,728,310 B1
(45) Date of Patent: May 20, 2014

(54) WATER PROCESSING SYSTEM

(71) Applicant: RR Fish SIA, Riga (LV)

(72) Inventor: Andrei Tjutjunnik, Riga (LV)

(73) Assignee: RR Fish SIA, Riga (LV)

( * ) Notice: Subject to any disclaimer, the term of this patent is extended or adjusted under 35 U.S.C. 154(b) by 0 days.

(21) Appl. No.: 13/801,559

(22) Filed: Mar. 13, 2013

(51) Int. Cl.
*C02F 1/78* (2006.01)
*B01F 3/04* (2006.01)

(52) U.S. Cl.
USPC ..... 210/205; 210/218; 210/221.1; 210/221.2; 261/121.1

(58) Field of Classification Search
USPC ........... 210/760, 195.3, 195.4, 205, 218, 220, 210/221.1, 221.2; 261/121.1, 122.1, 123, 261/124, DIG. 42, DIG. 70
See application file for complete search history.

(56) References Cited

U.S. PATENT DOCUMENTS

| | | | |
|---|---|---|---|
| 3,680,704 A * | 8/1972 | Schaefer | 210/218 |
| 5,961,831 A | 10/1999 | Lee et al. | |
| 6,001,247 A * | 12/1999 | Schulz | 210/220 |
| 6,017,020 A * | 1/2000 | Baughman et al. | 261/122.1 |
| 6,866,788 B1 | 3/2005 | Baig et al. | |
| 7,029,577 B2 | 4/2006 | Cummins | |
| 7,033,506 B2 | 4/2006 | Leieune | |
| 8,056,358 B1 | 11/2011 | Shelton | |
| 8,366,938 B2 | 2/2013 | Capeau et al. | |
| 2006/0191828 A1 | 8/2006 | Cummins | |
| 2008/0023407 A1 | 1/2008 | Eriksson et al. | |

FOREIGN PATENT DOCUMENTS

| | | |
|---|---|---|
| JP | 07-185539 | 7/1995 |
| JP | 2003-225654 | 8/2003 |

OTHER PUBLICATIONS

Article Abstract "The efficacy of ozonated seawater for surface disinfection of haddock (*Melanogrammus aeglefinus*) eggs against piscine nodavirus," by Buchan, et al., Aquacultural Engineering, Jun. 2006, http://www.sciencedirect.com/science/article/pii/S0144860905001317 (3 pgs.).
Presentation by Summerfelt, et al., "Ozonation and UV Disinfection," http://ag.arizona.edu/azaqua/ista/ISTA7/RecircWorkshop/Workshop%20PP%20%20&%20Misc%20Papers%20Adobe%202006/9%20Ozone%20&%20UV/Ozonation%20UV%0Disinfection.pdf (downdloaded), (63 pgs.).
Article "Ozonation of a Recirculating Rainbow Trout Culture System," by Bullock, et al., copyright 2011, http://www.absoluteozone.com/ozone_generator_aquaculture.htm, downloaded on /Dec. 17, 2012, (5 pgs.).

(Continued)

*Primary Examiner* — Lucas Stelling
(74) *Attorney, Agent, or Firm* — Berkeley Law & Technology Group, LLP (57) ABSTRACT

A system and method for processing impure water is achieved by using ozone for the separation and removal of certain contaminants and for further purification of the water. According to one embodiment, a gas comprised of ozone and air is injected into the impure water. The gas is converted to bubbles which are used as a flotation reagent while the ozone portion of the gas provides for the disinfection and deodorization of the liquid. The impure water is constantly supplied into an upper portion of a working volume or column of fluid contained within a processing unit. At the same time the gas is supplied into the bottom part of the same fluid column through one or more diffusers. Due to their porosity the diffusers generate the bubbles of this ozone-based gas so that each bubble has a predetermined size.

20 Claims, 6 Drawing Sheets

(56) References Cited

OTHER PUBLICATIONS

"Ozone and Aquaculture" web page, http://www.ozoneapplications.com/aquaculture/aquaculture.htm, downloaded on Dec. 17, 2012 (2 pgs.).

\* cited by examiner

WATER PROCESSING SYSTEM

FIELD OF INVENTION

This relates to a process for using a reactant to purify water that has solid or dissolved organic or mineral substances, in order to bring them below target maximum levels.

BACKGROUND

Water is becoming an increasingly valuable commodity. Many areas of the world must contend with a declining amount of fresh, usable water due to population growth, increasing industrialization, increased pollution, etc. Therefore the treatment of wastewater, including the use of water recycling methods, is becoming of increased importance.

In some countries water restrictions frequently are imposed by governments on domestic users and commercial institutions. Even if sources of fresh water are readily available, water conservation and recycling or reclaiming are ecologically and environmentally preferred options as well as cost efficient.

A number of known systems and processes exist for treating water to obtain potable and non-potable water of varying quality and for varying uses. Such processes and systems include the use of chemical treatment and physical treatment systems. The components of some systems include various filter and clarifier units, ultraviolet (or other electromagnetic) water treatment components, solid catalyst beds, pumps to move the water through the system, compressors for delivering oxygen, air or other gases to other system components, aeration basins, etc. with each component having its own treatment limitations and energy consumption demands.

A further disadvantage of the known systems is that the buildings or sheds which house the water processing components can include a maze of pipes and plumbing for use in pumping water between the system components, such as tanks, filters, biological filters, foam fractionators, ultraviolet water treatment units and other water treatment components. These often are individual components which frequently must be set up in different parts of a building. Also drainage pipes are often provided on the floor and water pipes are often connected to each individual tank or component.

Accordingly there is a need for improved systems and processes for treating water by using fewer system components and less energy.

SUMMARY OF CERTAIN EMBODIMENTS

Broadly speaking, certain embodiments of the invention relate to processing impure water by the separation and removal of certain contaminants and further purification of the water using a reactant such as ozone. According to one embodiment, a gas comprised of ozone and air is injected into the impure water. The gas is converted to bubbles which are used as a flotation reagent while the ozone portion of the gas provides for the disinfection and deodorization of the liquid. The impure water is constantly supplied into an upper portion of a working volume or column of fluid contained within a processing unit. At the same time, the gas is supplied into the bottom part of the same fluid column through one or more diffusers. Due to their porosity the diffusers generate the bubbles of this ozone-based gas so that each bubble has a predetermined size.

In one embodiment, a system for the processing of impure water uses a first liquid column, a second liquid column and bubbles in the first liquid column to generate treated water and a waste byproduct. The bubbles are a gas comprising ozone. The first liquid and second liquid columns are each of a height that is between about 3 meters and about 7 meters. The first liquid column has a first column upper end and a first column lower end. The second liquid column has a second column upper end and a second column lower end.

The system comprises a first chamber having a first chamber upper end, a first chamber lower end, a first chamber inlet disposed at the first chamber upper end, and a first chamber outlet disposed at the first chamber upper end. The first chamber is configured to contain the first liquid column. The first chamber inlet is configured to cause the impure water to flow into the first chamber and into the first liquid column. The system further comprises one or more diffusers which are disposed in the first chamber at the first chamber lower end and configured to generate the bubbles in the first liquid column. The bubbles have a diameter between about 0.5 mm and about 3 mm. The first chamber and the diffusers are further configured to cause the bubbles to flow upward in the first liquid column and to cause the impure water to flow downward in the first liquid column so that the impure water flows counter to the flow of the bubbles and into contact with the bubbles and thereby generate the treated water and the waste byproduct. The first chamber outlet is configured to allow the waste byproduct to flow out of the first chamber at the first chamber upper end.

The system further comprises a second chamber having a second chamber upper end, a second chamber lower end, and a second chamber outlet. The second chamber is configured to contain the second liquid column. The second chamber and the first chamber are in fluid communication so that the treated water can flow from the first liquid column at the first chamber lower end into the second liquid column at the second chamber lower end. The second chamber outlet is configured to allow the treated water to flow out of the second chamber.

In another aspect the first liquid column and the second liquid column are each of a height that is between about 5 meters and about 6 meters. The one or more diffusers are configured to generate bubbles having a diameter between about 1.8 mm and about 2.2 mm.

In another aspect the first chamber, the second chamber and the diffusers are configured to generate the treated water at a rate that is between about 200 cubic meters per hour ($m^3$/hr) and about 1,200 cubic meters per hour ($m^3$/hr). In another aspect they are configured to generate the treated water at a rate of about 550 cubic meters per hour ($m^3$/hr).

In another aspect the diffusers are further configured to generate the bubbles in the first liquid column at a rate that is between about 50 cubic meters of the gas per hour ($m^3$/hr) and about 300 cubic meters of the gas per hour ($m^3$/hr). In another aspect they are configured to generate the bubbles in the first liquid column at a rate of about 150 cubic meters of the gas per hour ($m^3$/hr).

In another aspect the second chamber outlet is disposed at the second chamber upper end and is configured to allow the treated water to flow out of the second chamber at the second chamber upper end.

In another aspect the first and second chambers are configured so that the treated water and the impure water are not treated by any one of an electromagnetic radiation and a solid catalyst as the impure water and the treated water flow within the first chamber and as the treated water flows within the second chamber.

In an alternative embodiment, a system for the processing of impure water uses a first liquid column and a second liquid column and further uses bubbles in the first liquid column to generate treated water and a waste byproduct. The bubbles are a gas comprising ozone. The system comprises a first chamber, a second chamber and one or more diffusers. The first chamber has a first chamber upper end, a first chamber lower end, a first chamber inlet disposed at the first chamber upper end, a first chamber outlet disposed at the first chamber upper end, and a first chamber wall.

The second chamber has a second chamber upper end, a second chamber lower end, and a second chamber outlet. The first chamber wall substantially surrounds the second chamber and is spaced apart from the second chamber and is configured to contain the first liquid column between the first chamber wall and the second chamber. The second chamber is configured to contain the second liquid column within the second chamber. The first chamber inlet is configured to allow the impure water to flow into the first chamber.

The diffusers are disposed at the first chamber lower end and configured to generate the bubbles in the first liquid column. The first chamber and the diffusers are further configured to cause the bubbles to flow upward in the first liquid column and to cause the impure water to flow downward in the first liquid column so that the impure water flows counter to the flow of the bubbles and into contact with the bubbles and thereby generate the treated water and the waste byproduct.

The first chamber outlet is configured to allow the waste byproduct to flow out of the first chamber. The first and second chambers are configured to be in fluid communication with one another so that the treated water can flow from the first chamber lower end into the second chamber lower end. The second chamber is configured so that the treated water can flow upward from the second chamber lower end and out of the second chamber via the second chamber outlet.

In another aspect the first liquid column has a first column upper end and a first column lower end. The first chamber inlet is configured to allow the impure water to flow into the first chamber and to fall onto the first liquid column at the first column upper end.

In another aspect the second liquid column has a second column upper end, a second column lower end, and a free surface disposed at the second column upper end. The second chamber outlet comprises a sluice gate having a movable barrier, which in turn has an upper edge and a lower edge. The sluice gate is configured to move the upper edge of the movable barrier to allow the treated water to flow from the free surface of the second liquid column over the upper edge and out of the second chamber.

In another aspect the first chamber has a first chamber middle portion disposed between the first chamber upper end and the first chamber lower end. The first chamber further comprises a plurality of baffles extending from the first chamber wall to the second chamber and further extending vertically from the first chamber upper end and terminating at the first chamber middle portion thereby defining a plurality of vertical channels in a portion of the first chamber.

In another aspect the first liquid column has a first column upper end and a first column lower end. The first chamber outlet is comprised of a plurality of covers disposed above the first liquid column and also disposed above the plurality of channels so that each one of the plurality of covers is disposed above a corresponding one of the plurality of channels. Each of the plurality of covers is vault-shaped and has an apex.

The first chamber outlet is further comprised of a plurality of conduits, each one of which extends from a corresponding one of the plurality of covers at the apex. The plurality of covers are configured to permit the waste byproduct to flow from the first liquid column and into the plurality of conduits.

In another aspect the second chamber has a second chamber wall configured to separate the first liquid column and the second liquid column. The second chamber wall defines a plurality of ports disposed at the second chamber lower end. The first chamber and the second chamber are configured to be in fluid communication with one another via the plurality of ports.

In another aspect the one or more diffusers are a plurality of diffusers which are disposed generally uniformly on an imaginary, generally horizontal plane at the first chamber lower end. In another aspect the plurality of diffusers is between about 50 diffusers and about 200 diffusers.

In another aspect the first and second chambers each have a generally cylindrical shape. The first chamber has an inner diameter of a length that is between about 3 meters and about 8 meters. The second chamber has an inner diameter of a length that is between about 2 meters and 7.8 meters. In another aspect the inner diameter of the first chamber is about 5 meters, and the inner diameter of the second chamber is about 3.5 meters.

In an alternative embodiment a system for the processing of impure water uses a liquid column and uses bubbles in the liquid column to generate treated water and a waste byproduct. The bubbles are a gas comprising ozone. The liquid column has a liquid column upper end and a liquid column lower end, and has a height that is between about 3 meters and about 7 meters. The system comprises a chamber having a chamber upper end, a chamber lower end, a chamber inlet disposed at the chamber upper end, a chamber first outlet disposed at the chamber upper end, and a chamber second outlet disposed at the chamber lower end. The chamber is configured to contain the liquid column and to cause the impure water to flow into the chamber and into the liquid column at the liquid column upper end, At least one diffuser is disposed in the chamber at the chamber lower end and configured to generate the bubbles in the liquid column. The bubbles have a diameter between about 0.5 mm and about 3 mm. The chamber and the at least one diffuser are further configured to cause the bubbles to flow upward in the liquid column and to cause the impure water to flow downward in the liquid column so that the impure water flows counter to the flow of the bubbles and into contact with the bubbles and thereby generate the treated water and the waste byproduct. The chamber first outlet is configured to allow the waste byproduct to flow out of the chamber at the chamber upper end. The chamber second outlet is configured to allow the treated water to flow out of the chamber at the liquid column lower end.

In another aspect the liquid column has a height that is between about 5 meters and about 6 meters. In yet another aspect the at least one diffuser is configured to generate bubbles having a diameter between about 1.8 mm and about 2.2 mm.

In yet another embodiment, a system is for the processing of impure water using a first liquid column and a second liquid column. The system further uses bubbles in the first liquid column to generate treated water and a waste byproduct. The bubbles are a gas comprising ozone. The system comprises: (a) means for introducing the impure water into the first liquid column so that the impure water flows downward in the first liquid column; (b) means for injecting bubbles into the first liquid column so that the bubbles flow upward and the impure water flows counter to the flow of the bubbles and into contact with the bubbles and thereby generates the treated water and the waste byproduct; (c) means for removing the waste byproduct from the first liquid column; (d) means for causing the treated water to flow from the first liquid column into the second liquid column and to flow upward within the second liquid column; and (e) means for removing the treated water from the second liquid column.

In another aspect the first liquid column and the second liquid column are each of a height that is between about 3 meters and about 7 meters. The bubbles have a diameter between about 0.5 mm and about 3.0 mm.

In another aspect the first liquid column and the second liquid column are each of a height that is between about 5 meters and about 6 meters. The bubbles have a diameter between about 1.8 mm and about 2.2 mm.

In yet another embodiment, impure water is introduced into an upper portion of a first liquid column so that the impure water flows downward in the first liquid column. Bubbles are injected into a lower portion of the first liquid column so that the bubbles flow upward and the impure water flows counter to the flow of the bubbles and into contact with the bubbles and thereby generates treated water and a waste byproduct. The bubbles are a gas comprising ozone and have a diameter between about 0.5 mm and about 3 mm. The waste byproduct is removed from the first liquid column at the upper portion of the first liquid column. The treated water is caused to flow from the lower portion of the first liquid column into a lower portion of a second liquid column and to flow upward within the second liquid column. The treated water is removed from the second liquid column. The first liquid column and the second liquid column are each of a height that is between about 3 meters and about 7 meters.

In another aspect the introducing of the impure water into the first liquid column includes pouring the impure water onto a top of the first liquid column.

In another aspect the removing of the treated water from the second liquid column includes removing the treated water from the upper portion of the second liquid column at a free surface of the second liquid column.

In another aspect the first liquid column and the second liquid column are each of a height that is between about 5 meters and about 6 meters. The bubbles have a diameter between about 1.8 mm and about 2.2 mm.

In another aspect the bubbles are comprised of ozone and air in a concentration between about 2 grams of ozone per cubic meter ($g/m^3$) of air to about 20 grams of ozone per cubic meter ($g/m^3$) of air.

In another aspect the removing of the treated water from the upper portion of the second liquid column includes removing the treated water at a rate that is between about 200 cubic meters per hour ($m^3/hr$) and about 1,200 cubic meters per hour ($m^3/hr$). In another aspect the removing of the treated water is at a rate of about 550 cubic meters per hour ($m^3/hr$).

In another aspect the injecting of the bubbles into the lower portion of the first liquid column includes injecting the bubbles at a rate that is between about 50 cubic meters of the gas per hour ($m^3/hr$) and about 300 cubic meters of the gas per hour ($m^3/hr$). In another aspect the injecting of the bubbles is at a rate of about 150 cubic meters of the gas per hour ($m^3/hr$).

In another aspect the treated water and the impure water are not treated by any one of an electromagnetic radiation and a solid catalyst as the impure water and the treated water flow within the first column and as the treated water flows within the second liquid column.

In an alternative embodiment impure water is introduced into an upper portion of a liquid column so that the impure water flows downward in the liquid column. The liquid column has a height that is between about 3 meters and about 7 meters. Bubbles are injected into a lower portion of the liquid column so that the bubbles flow upward and the impure water flows counter to the flow of the bubbles and into contact with the bubbles and thereby generates treated water and a waste byproduct. The bubbles are a gas comprising ozone and have a diameter between about 0.5 mm and about 3 mm. The waste byproduct is removed from the liquid column at the upper portion of the liquid column. The treated water is caused to flow from the lower portion of the liquid column so that the treated water is removed from the liquid column.

In another aspect the liquid column has a height that is between about 5 meters and about 6 meters. In yet another aspect the bubbles have a diameter between about 1.8 mm and about 2.2 mm.

In yet another embodiment a method of processing water is for use in aquaculture. Basin water is caused to flow from a basin to and through a biological filter unit thereby producing partially treated water. The basin contains at least one live animal. The partially treated water is moved from the biological filter unit into an upper portion of a first liquid column so that the partially treated water flows downward in the first liquid column. Bubbles are injected into a lower portion of the first liquid column so that the bubbles flow upward and the partially treated water flows counter to the flow of the bubbles and into contact with the bubbles and thereby generates a higher quality water and a waste byproduct. The bubbles are a gas comprising ozone and have a diameter between about 0.5 mm and about 3 mm.

The waste byproduct is removed from the first liquid column at the upper portion of the first liquid column. The higher quality water is caused to flow from the lower portion of the first liquid column into a lower portion of a second liquid column and to flow upward within the second liquid column. The first liquid column and the second liquid column are each of a height that is between about 3 meters and about 7 meters. The higher quality water is removed from the second liquid column. The higher quality water is caused to flow from the second liquid column to the basin.

In another aspect the basin water flows from the basin to the biological filter unit under the influence of gravity. The higher quality water flows from the second liquid column to the basin under the influence of gravity.

In another aspect the basin water is not treated by any one of an electromagnetic radiation and a solid catalyst as the basin water flows between the basin and the biological filter. The partially treated water is not treated by any one of the electromagnetic radiation and the solid catalyst as the partially treated water flows between the biological filter and the first liquid column. The higher quality water and the partially treated water are not treated by any one of the electromagnetic radiation and the solid catalyst as the partially treated water and the higher quality water flow within the first liquid column and as the higher quality water flows within the second liquid column. The higher quality water is not treated by any one of the electromagnetic radiation and the solid catalyst as the higher quality water flows between the second liquid column and the basin.

In another aspect the partially treated water includes about 20 milligrams per liter of suspended solids and about 4 milligrams per liter of dissolved oxygen and about 15 milligrams per liter of permanganate oxygen consumed and about 0.2 milligrams per liter of nitrites. The higher quality water includes about 5 milligrams per liter of suspended solids and about 8 milligrams per liter of dissolved oxygen and about 5 milligrams per liter of permanganate oxygen consumed and about 0.01 milligrams per liter of nitrites.

In another aspect the first and second liquid columns are each of a height that is between about 5 meters and about 6 meters. The bubbles have a diameter between about 1.8 mm and about 2.2 mm.

In another aspect the moving of the partially treated water into the upper portion of the first liquid column includes pouring the partially treated water onto a top of the first liquid column.

In another aspect the removing of the higher quality water from the second liquid column includes removing the higher quality water from an upper portion of the second liquid column at a free surface of the second liquid column.

In another aspect the bubbles are comprised of ozone and air in a concentration between about 2 grams of ozone per cubic meter ($g/m^3$) of air to about 20 grams of ozone per cubic meter ($g/m^3$) of air.

In another aspect the injecting of the bubbles into the lower portion of the first liquid column includes injecting the bubbles at a rate of about 150 cubic meters per hour ($m^3/hr$).

In another aspect the removing of the higher quality water from the second liquid column includes removing the higher quality water at a rate that is between about 200 cubic meters per hour ($m^3/hr$) and about 1,200 cubic meters per hour ($m^3/hr$). In another aspect the removing of the higher quality water is at a rate of about 550 cubic meters per hour ($m^3/hr$).

In another aspect the injecting of the bubbles into the lower portion of the first liquid column includes injecting the bubbles at a rate that is between about 50 cubic meters of the gas per hour ($m^3/hr$) and about 300 cubic meters of the gas per hour ($m^3/hr$). In another aspect the injecting of the bubbles is at a rate of about 150 cubic meters of the gas per hour ($m^3/hr$).

There are additional aspects to the present inventions. It should therefore be understood that the preceding is merely a brief summary of some embodiments and aspects of the present inventions. Additional embodiments and aspects are referenced below. It should further be understood that numerous changes to the disclosed embodiments can be made without departing from the spirit or scope of the inventions. The preceding summary therefore is not meant to limit the scope of the inventions. Rather, the scope of the inventions is to be determined by appended claims and their equivalents.

BRIEF DESCRIPTION OF THE DRAWINGS

These and/or other aspects and advantages of the present invention will become apparent and more readily appreciated from the following description of certain embodiments, taken in conjunction with the accompanying drawings of which.

DETAILED DESCRIPTION

The following description is of the best mode presently contemplated for carrying out the invention. Reference will be made in detail to embodiments of the present invention, examples of which are illustrated in the accompanying drawings, wherein like reference numerals refer to like elements throughout. It is understood that other embodiments may be used and structural and operational changes may be made without departing from the scope of the present invention.

A system and method of processing impure water includes the separation and removal of certain contaminants and further purification of the water using a reactant. According to one embodiment of the invention, a gas comprised of ozone and air is injected in impure water. The gas is converted to bubbles having a predetermined size which are used as a flotation reagent while the ozone portion of the gas provides for the disinfection and deodorization of the liquid.

The impure water is constantly supplied into an upper portion of a working volume or column of fluid contained within a processing unit. At the same time, the gas is supplied into the bottom part of the same fluid column through one or more diffusers. Due to their porosity the diffusers generate the bubbles of this ozone-based gas wherein each bubble has a diameter between about 1.8 millimeters (mm) to about 2.2 mm according to one embodiment. Liquid decontamination, disinfection and deodorization takes place in a working volume of this liquid column as a result of a tension-active effect of the motion of the bubbles through liquid and as a result of the chemical reaction between the ozone and the impure water.

It is believed that the use of bubbles which have a predetermined size between about 1.8 mm and about 2.2 mm in diameter in a liquid column having a height between about 5 meters and about 6 meters, results in a reduced speed of ascent of the bubbles. (In alternative embodiments however bubbles between about 0.5 mm and about 3 mm in diameter can be used in liquid columns having heights between about 3 meters and about 7 meters.) This reduced ascent speed provides for an increased time for the gas bubbles to contact and interact with the impure water. This increased time allows for the maintenance of a tension-active interaction of ozone with the contaminant and for maximizing the removing of the suspended and dissolved substances. The predetermined size of the bubbles in liquid columns of this range of heights, along with the use of ozone as a component of the bubbles, provides for a high activity of the gas-liquid interface.

It is further believed that the efficiency of the processing of the impure water using the ozone-gas bubbles directly depends on the size of the bubbles and their size uniformity. Also the coefficient of impure water interfusion (i.e., the contact probability of the contamination with the gas-liquid interface, the contact time of the impure water with the ozone-gas bubbles, and the ozone concentration in the ozone-gas mixture) is believed to depend on the bubble size uniformity.

During the course of the movement of the bubbles upward through the working volume of the liquid column, their volume increases due to the hydrostatic pressure reduction in the liquid as the bubbles rise. Consequently it is believed that the liquid-to-gas mixture interface increases, which in turn increases the ozone-to-contaminant interaction efficiency. As the bubbles rise in the liquid column, their size changes slowly (and not in proportion to water pressure) due to the surface tension of the bubbles. The bubble size is predetermined to maximize the effect of the removal of dissolved and suspended matter due to an outer layer activation by the ozone.

Thus it is further believed that there is an inter dependence among some of the above operating parameters and the effectiveness of certain embodiments of the present invention. For example if the liquid column is too short in height, there would be less time for the ozone to react with the impure water. As a result the amount of impurities removed from the water would be reduced, or it may otherwise be necessary to reduce the speed of the impure water through the working liquid column and thereby reduce the rate of clean water output. On the other hand if the liquid column is too great in height it is believed that the ozone gas bubbles of a given size would collapse too soon (i.e., at too great a depth within the liquid column). As a result, certain impurities would not attach or remain attached to the bubbles and would fall to the bottom of the liquid column and not be removed.

Referring to FIGS. 1-5 a system 100 for processing impure water includes a first chamber 102, a second chamber 104 and a plurality of diffusers 106. The first chamber 102 contains a first liquid column 108 having a first column upper end 110 and a first column lower end 112. The second chamber 104 contains a second liquid column 114 having a second column upper end 116, a second column lower end 118, and a free surface disposed at the second column upper end 116. In the illustrated embodiment the first and second liquid columns 108, 114 each have a height that is between about 5 meters and about 6 meters. In alternative embodiments however each liquid column can have a height of between about 3 meters and about 7 meters.

The first chamber 102 is generally cylindrical in shape and has a first chamber upper end 120, a first chamber lower end 122, a first chamber wall 124, a first chamber inlet 126 disposed at the first chamber upper end 120, and a first chamber outlet 128 also disposed at the first chamber upper end 120. The second chamber 104 also is generally cylindrical in shape and has a second chamber upper end 130, a second chamber lower end 132, a second chamber wall 134, and a second chamber outlet 136 disposed at the second chamber upper end 130. The second chamber wall 134 separates the first and second liquid columns 108, 114.

The first chamber wall 124 substantially surrounds the second chamber 104, is spaced apart from the second chamber 104 and is configured to contain the first liquid column 108 between the first chamber wall 124 and the second chamber 104. Thus in the illustrated embodiment the first and second chambers 102, 104 can be considered to be, respectively, outer and inner tanks (i.e., nested tanks) with a void between them for holding the first liquid column 108, and with the second liquid column 114 being contained within the inner tank. In alternative embodiments however the chambers need not be nested and need not be cylindrical in shape. Alternative embodiments include other arrangements, shapes and profiles of chambers or tanks that are configured to contain two liquid columns and to allow a fluid communication between them, or alternatively still are configured to contain only one liquid column which in turn is in fluid communication with a conduit, chamber or other type of liquid holding structure, which such structures do not hold a second liquid column but nevertheless can receive the treated water from the one liquid column.

In the illustrated embodiment the inner diameter of the first chamber 102 is about 5 meters, and the inner diameter of the second chamber 104 is about 3.5 meters. However alternative embodiments include inner diameters of the first chamber 102 having a length of between about 3 meters and about 8 meters, and inner diameters of the second chamber 104 having a length between about 2 meters and about 7.8 meters.

The first chamber 102 also has a first chamber middle portion 138 disposed between the first chamber upper end 120 and the first chamber lower end 122. A plurality of baffles 140 extends radially from the first chamber wall 124 to the second chamber 104 and also extends vertically from the first chamber upper end 120 and terminating at the first chamber middle portion 138 thereby defining a plurality of vertical channels 142 extending into the first chamber upper end 120. However the portion of the first chamber 102 that is below the baffles 140 remains open so as to define one contiguous portion 144 of this chamber at this location.

The first chamber inlet 126 is configured to allow the impure water to flow into the first chamber 102 and to fall onto a top of the first liquid column 108 at the first column upper end 110 so that the impure water flows downward in the first liquid column 108. The first chamber inlet 126 includes an inlet conduit 146 attached to the first chamber wall 124 and partially formed by this wall 124 and disposed at the upper end 120 of the chamber. The inlet conduit 146 receives the impure water from a source outside of the system 100 via an impure water supply pipe 147. The inlet conduit 146 is generally circular in shape when viewed from above, has a vertical cross-section with a generally rectangular shape, and extends around the outer perimeter of the first chamber 102 at the first chamber upper end 120. The first chamber inlet 126 further comprises a plurality of inlet ports 150, one side of which are disposed inside of the inlet conduit 146. The inlet ports 150 are defined by the first chamber wall 124 thus allowing the incoming impure water to flow from the inlet conduit 146 through the inlet ports 150 and into the first chamber 102. Associated with each of the plurality of inlet ports 150 is a trough 148 disposed inside the first chamber 102 and adjacent to and in fluid communication with one inlet port 150. Each trough 148 extends radially from the first chamber wall 124 to the second chamber wall 134. Thus the incoming impure water flows through the inlet ports 150 and into the plurality of troughs 148 where the water overflows the troughs 148 and spills over the upper edges of the troughs 148 and onto the top of the first liquid column 108 as shown by the flow arrows in FIG. 2 having reference numeral 152.

Figure 4:
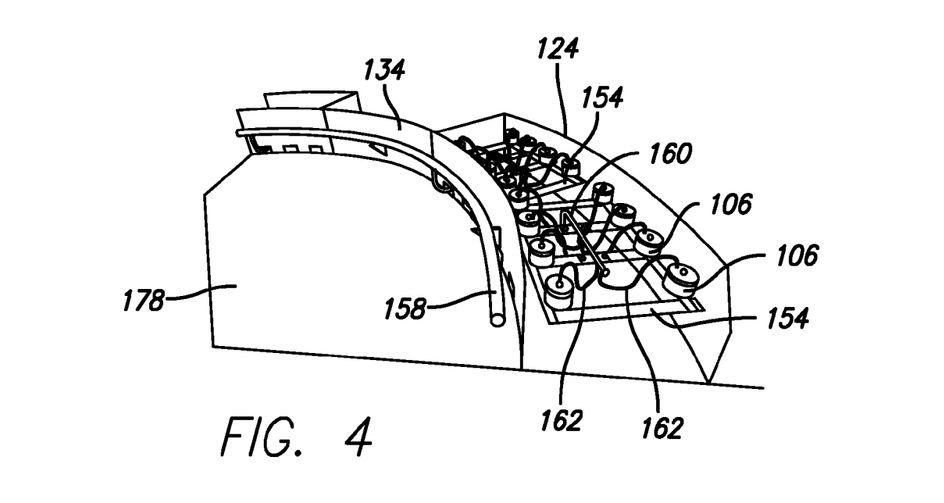
FIG. 4 is a perspective view of some of the diffusers of the system of FIG. 1.
Figure 5:
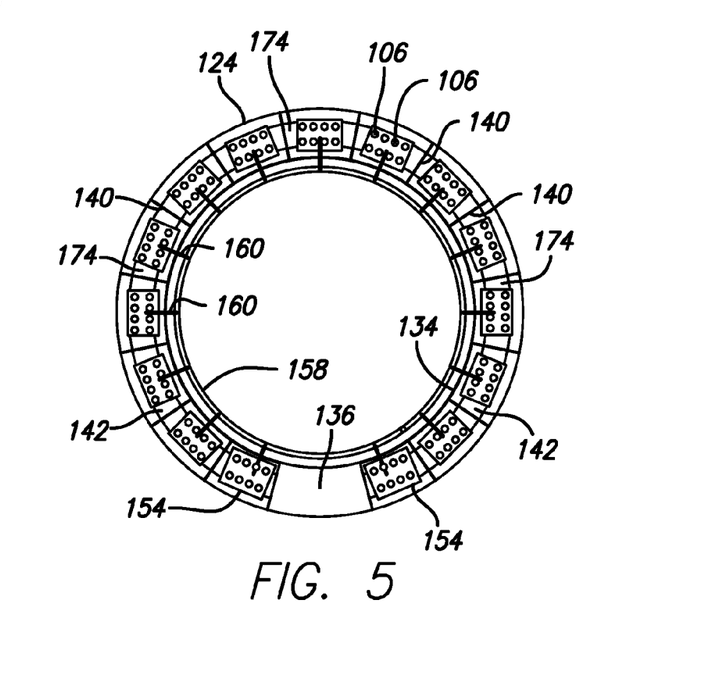
FIG. 5 is a horizontal cross section view of the system as viewed from the arrows 5-5 of FIG. 3.

Referring to FIGS. 4-5, the diffusers 106 are disposed in a generally uniform manner on an imaginary horizontal plane at the first chamber lower end 122. In the illustrated embodiment a plurality of mounting brackets 154 are disposed in a generally circular array within the first chamber lower end 122 with eight diffusers 106 being mounted on each bracket 154. The diffusers 106 are supplied with a gas (comprised of ozone and air) via an inlet pipe 156 that extends from the top of the second chamber 104 into the second liquid column 114 and to the second chamber lower end 118. In the illustrated embodiment the gas has an ozone concentration that is between about 2 grams of ozone per cubic meter ($g/m^3$) of air to about 20 grams of ozone per cubic meter ($g/m^3$) of air. To improve the contaminant removal effectiveness of the system 100, the user can adjust the ozone concentrations according to the level of pollution of the impure water. Other concentrations may be used in other embodiments however. Also other embodiments may use gas that is comprised of ozone in combination with one or more gases other than air, such as for example ozone in combination with oxygen or ozone in combination with an air/oxygen mixture, etc.

At the second chamber lower end 132 the inlet pipe 156 is connected to a generally circularly-shaped gas supply header 158 disposed adjacent to the second chamber wall 134 at the second chamber lower end 132. Feeder pipes 160 extend from the gas supply header 158, through the second chamber wall 134, into the first chamber 102 and to the mounting brackets 154. In the illustrated embodiment there are fifteen (15) feeder pipes 160 leading to fifteen (15) mounting brackets 154. At each mounting bracket 154 there are a plurality individual supply lines 162 that feed the gas from the feeder pipes 160 to each of the diffusers 106.

Each of the diffusers 106 is a hollow, cylindrically-shaped structure that is manufactured of sintered titanium powder and has stainless steel caps on the top and bottom ends. It is believed that the use of titanium is advantageous in that this material resists the erosion or oxidation caused by the use of ozone. However materials other than titanium can be used. Each diffuser 106 is about 60 mm high with an outer diameter of about 80 mm and a wall thickness of about 8 mm. In alternative embodiments however the diffusers 106 each can have a height from about 3 cm to about 15 cm and can have a diameter from about 4 cm to about 12 cm. The titanium powder is alloyed or fused so that each diffuser 106 has a porosity for generating bubbles of a pre-defined size or diameter. In the illustrated embodiment each diffuser 106 is configured to generate bubbles so that each bubble has a diameter between about 1.8 mm and about 2.2 mm. In alternative embodiments each bubble has a diameter between about 0.5 mm and about 3 mm.

In the illustrated embodiment all of the diffusers 106 collectively are configured to generate the bubbles in the first liquid column 108 at a rate of about 150 cubic meters of the gas per hour ($m^3$/hr). However alternative embodiments of the invention include diffusers that generate bubbles at a rate that is between about 50 cubic meters of the gas per hour ($m^3$/hr) and about 300 cubic meters of the gas per hour ($m^3$/hr). While the illustrated embodiment shows fifteen (15) brackets 154 supporting 8 diffusers per bracket, or a total of 120 diffusers, alternative embodiments can include other quantities such as, for example, between about 50 diffusers and about 200 diffusers. In still other alternative embodiments, the diffusers can have shapes other than the vertically-oriented cylindrical shape shown in FIG. 4 so that only one diffuser or a few diffusers can be used.

The first chamber 102 and the diffusers 106 are further configured to cause the bubbles to flow upward in the first liquid column 108 (as shown by the flow arrows of reference numeral 155 of FIGS. 2 and 3) and to cause the impure water to flow downward in the first liquid column 108 so that the impure water flows counter to the flow of the bubbles and into contact with the bubbles thus providing an interaction which generates a waste byproduct, at least a portion of which can be a foam substance, and which generates treated water. The baffles 140 serve to inhibit excessive horizontal flow of the bubbles so that they have an improved flow in a generally vertical direction which in turn enhances the interaction of the bubbles and impure water.

Figure 1:
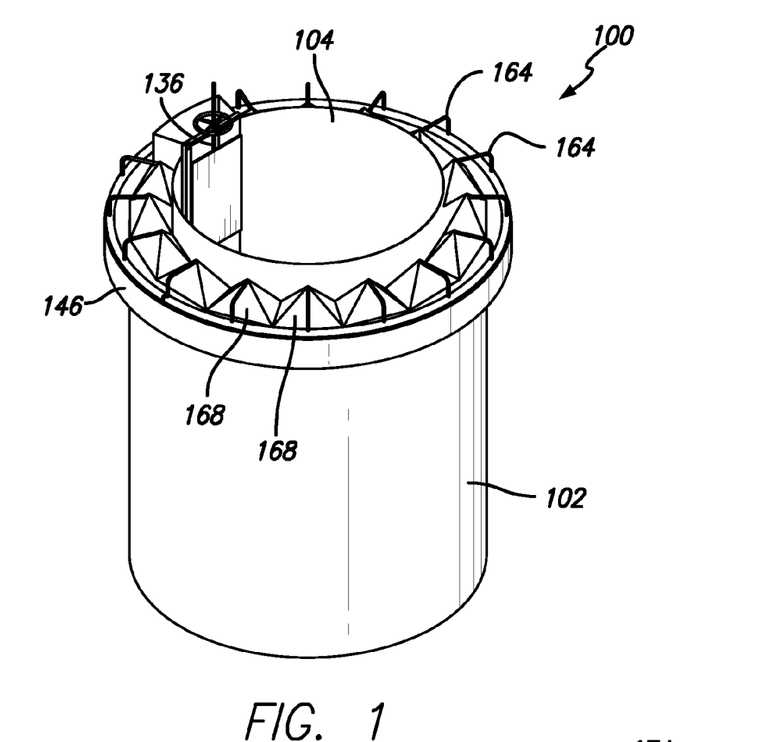
FIG. 1 is a top perspective view of a water processing system in accordance with one embodiment of the invention.
Figure 2:
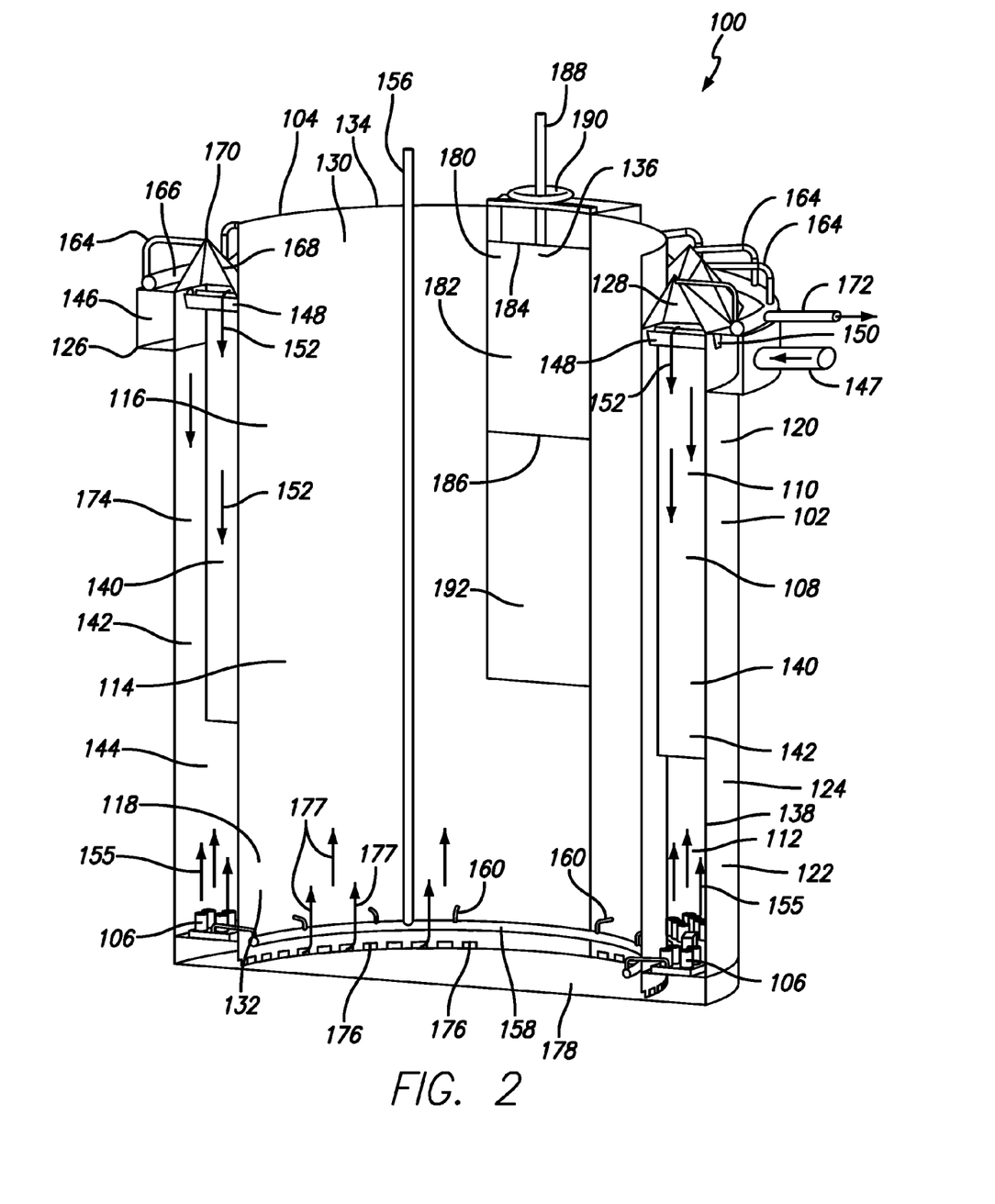
FIG. 2 is a cross-sectional perspective view the system of FIG. 1.

Due to the action of the bubbles the waste byproduct (which includes the foam) rises in the first liquid column 108 while the treated water flows toward the bottom. The first chamber outlet 128 is disposed at the first chamber upper end 120 and is configured to allow the waste byproduct to flow out. As best seen in FIG. 2 the first chamber outlet 128 is comprised of a plurality of conduits 164 that are connected to a common waste discharge header 166 and of a plurality of covers 168 that are disposed above the first liquid column 108. The covers 168 are further disposed above the channels 142 so that each one of the covers 168 is disposed above a corresponding one of the channels 142. Each of the covers 168 is vault-shaped and has an apex 170. Each of the conduits 164 extends from the apex 170 of a corresponding one of the covers 168, so that the covers 168 direct the waste byproduct to flow from the first liquid column 108, into the conduits 164 and then into the waste discharge header 166. This header 166 is a generally circular-shaped pipe (as viewed from above) that extends substantially around the first chamber 102 and is disposed on the top of the inlet conduit 146. A waste outlet pipe 172 is connected to the waste discharge header 166 and allows the waste byproduct to flow away from the water treatment system 100.

As previously mentioned the covers 168 are above the channels 142 so that each one of the covers 168 is disposed above a corresponding one of the channels 142. The covers 168 are connected to the first chamber 102 and to the plurality of baffles 140 thus forming a plurality of separate sub-chambers 174 disposed within the first chamber 102. Each of these sub-chambers 174 has a bottom end that is open-ended at the bottom edges of the baffles 140. Each sub-chamber 174 is disposed above one of the diffuser mounting brackets 154 so that eight of the diffusers 106 are directly below each of the fifteen sub-chambers 174 as best seen in FIGS. 2 and 5. However the top ends of the sub-chambers 174 are separated from one another so that there is no fluid communication of the waste byproduct between the sub-chambers 174 at the upper end of the first chamber 102. Thus at locations above the bottom edges of the baffles 140 the first chamber 102 is in effect divided into fifteen sub-chambers 174 which have no fluid communication between each other at the upper end of the first chamber 102 and in effect acting as separate water processing units in some respects. As best seen in FIG. 5 the fifteen sub-chambers 174, which are defined in part by the baffles 140, extend substantially around the second chamber 104. Thus the fifteen sub-chambers 174 collectively surround the second chamber 104 defining an imaginary arc of about 330° with the remaining about 30° corresponding to the location and operation of the second chamber outlet 136 which is described below. In alternative embodiments however the sub-chambers can be of different sizes and configurations, or alternatively still, there need not be any sub-chambers.

The second chamber wall 134 defines a plurality of ports 176 disposed at the second chamber lower end 132, and more specifically disposed below the elevation of the diffusers 106 and adjacent to a bottom wall 178 of the second chamber 104. The first chamber 102 and the second chamber 104 are configured to be in fluid communication with one another via these ports 176 so that the treated water can flow from the first chamber lower end 122 through the ports 176 and into the second chamber lower end 132 as shown by the flow arrows of reference numeral 177 of FIGS. 2 and 3. In the illustrated embodiment there are a total of forty five ports 176 in the second chamber wall 134. Each port 176 has a dimension of about 120 mm width and about 50 mm height, so that cumulatively the ports 176 provide a combined area of about 2,700 $cm^2$ through which the treated water can flow. However alternative embodiments can include a different number of ports 176 having different dimensions. Once inside the second chamber 104 the treated water flows upward from the second chamber lower end 132 and out of the second chamber 104 via the second chamber outlet 136.

Figure 3:
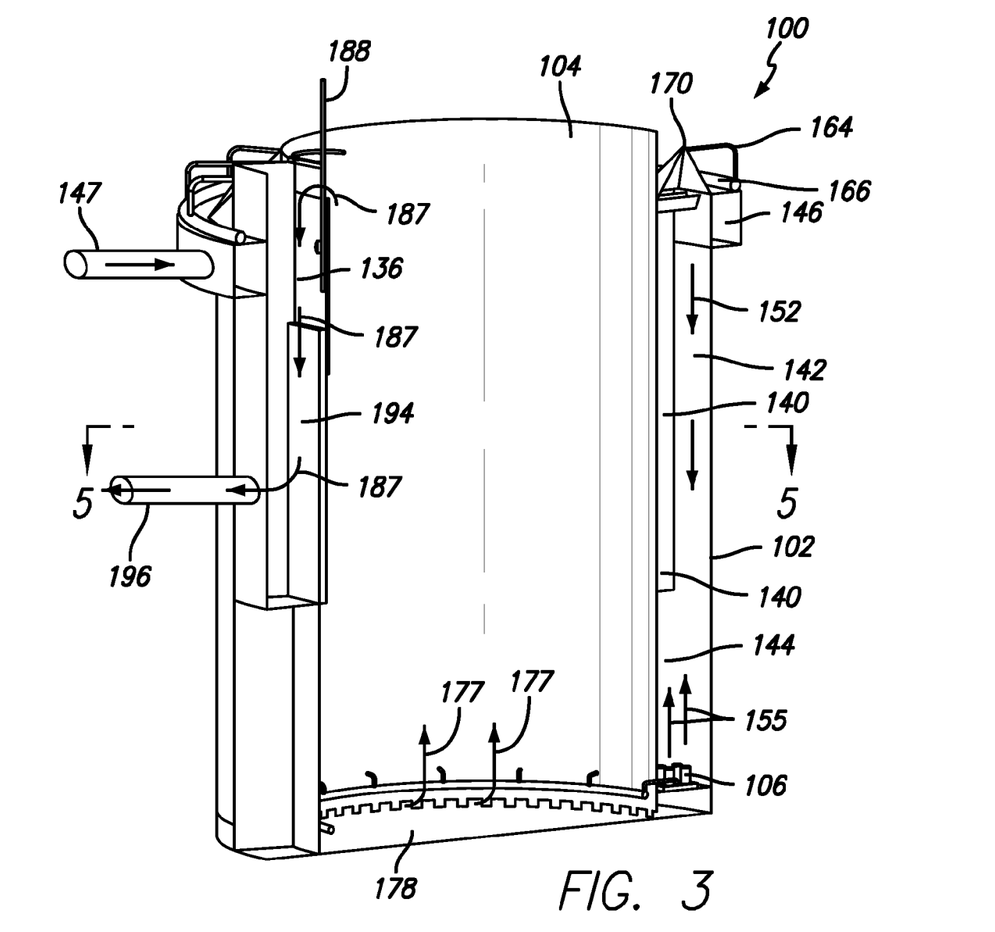
FIG. 3 is a cross-sectional perspective view of the system of FIG. 1 as viewed from a different angle.

As best seen in FIGS. 2 and 3, the second chamber outlet 136 is disposed at the second chamber upper end 130 and comprises a sluice gate 180 (or weir) having a movable barrier 182 with an upper edge 184 and a lower edge 186. The movable barrier 182 can be positioned so that its upper edge 184 is at a level corresponding to the free surface of the second liquid column 114 thus allowing the treated water to flow over the upper edge 184 and out of the second chamber 104 as shown by the flow arrows of reference numeral 187. The movable barrier 182 is connected to a threaded rod 188 which in turn is connected to a hand wheel 190. By turning the hand wheel 190, the movable barrier 182 slides vertically within a groove 192 that is disposed on the second chamber wall 134. By moving the barrier 182 to various vertical positions, a user can adjust the height of the second liquid column 114 which in turn causes the first liquid column to be adjusted to a similar height due to the fluid communication between the columns. Thus the user can position the movable barrier 182 to various heights depending upon the pollution density and volume of incoming impure water.

As best seen in FIG. 3, after the treated water flows over the upper edge 184 of the movable barrier 182, it flows into an outlet reservoir 194 that is defined by the first and second chambers 102, 104. From the outlet reservoir 194 the treated water flows into an outlet pipe 196 that is connected to the outlet reservoir 194 and that carries the treated water away from the system 100.

While the illustrated embodiment shows the second chamber outlet 136 disposed at the second chamber upper end 130 so that the treated water flows away at the second liquid column 114 free surface, alternative embodiments include outlets that are not sluice gates and/or that are disposed at lower elevations in the second chamber 104. Such alternative chamber outlets use outlet ports in the second chamber wall 134 in communication with internal or external conduits and valves for controlling the rate of transfer of treated water from the second column.

In the illustrated embodiment the first and second liquid columns 108, 114 are typically operated at column heights between about 5 meters and 6 meters. At a column height of 5 meters the volume of liquid in the first chamber 102 is between about 37-40 cubic meters ($m^3$) and the volume of liquid in the second chamber 104 is between about 51-56 $m^3$. At a column height of 6 meters the volume of liquid in the first chamber 102 is between about 46-49 $m^3$ and the volume of liquid in the second chamber 104 is between about 62-67 $m^3$. Operating within the foregoing parameters, the first chamber 102, the second chamber 104 and the diffusers 106 of the illustrated embodiment can generate the treated water at a rate of about 550 cubic meters per hour ($m^3$/hr). In alternative embodiments however treated water is generated at a rate between about 200 $m^3$/hr and about 1,200 $m^3$/hr. Also alternative embodiments are not limited to the above-described column heights and chamber capacities, and can include other dimensions and capacities.

Thus it can be appreciated that with the inventive system and methods, such as for example that which is illustrated in FIGS. 1-5, a larger quantity of impure water can be treated effectively and rapidly using ozone. The system process combines the disinfection, decontamination and deodorization of water in a single process. Moreover this is accomplished without any treatment of the impure water or the treated water by electromagnetic radiation (including no treatment by ultraviolet radiation) or by any solid catalyst as this water flows in the first and second chambers 102, 104.

Figure 6:
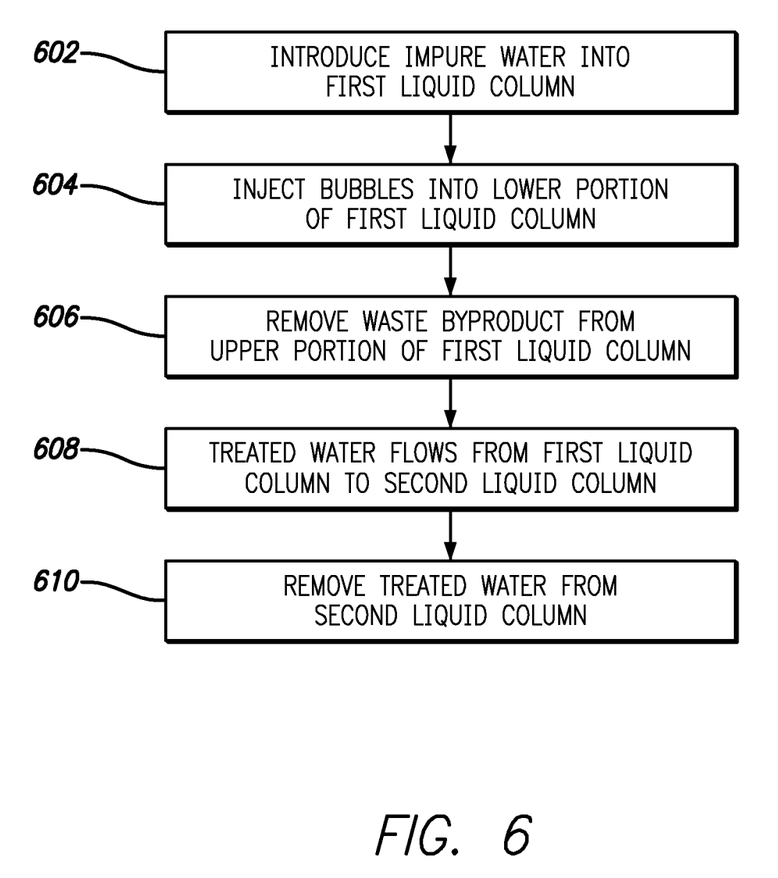
FIG. 6 is a simplified process flow diagram of a method of processing impure water according to another embodiment of the invention.

FIG. 6 illustrates a simplified process flow diagram of a method of processing impure water according to another embodiment of the invention. First, the impure water is introduced into an upper portion of a first liquid column so that the impure water flows downward in the first liquid column. (Step 602) The first liquid column has a height that is between about 5 meters and about 6 meters, and in an alternative embodiment has a height between about 3 meters and about 7 meters. Bubbles are injected into a lower portion of the first liquid column so that they flow upward and the impure water flows counter to the flow of the bubbles and into contact with the bubbles and thereby generates treated water and a waste byproduct. (Step 604) The bubbles are a gas comprising ozone and have a diameter between about 1.8 mm and about 2.2 mm, and in an alternative embodiment have a diameter between about 0.5 mm and about 3 mm. The waste byproduct is removed from the first liquid column at the upper portion of the first liquid column. (Step 606) The treated water is caused to flow from the lower portion of the first liquid column into a lower portion of a second liquid column and to flow upward within the second liquid column. (Step 608) The second liquid column has a height that is between about 5 meters and about 6 meters, and in an alternative embodiment has a height between about 3 meters and about 7 meters. The treated water is then removed from the second liquid column. (Step 610) In alternative embodiments, however, a second liquid column need not be used. Rather other methods for collecting the treated water from the first liquid column and transferring the treated water away can be used. Such other methods include the use of designs or components that may include, but not be limited to, conduits, chambers, receivers and other liquid holding structures which receive the treated water but without using a second liquid column to do so.

Figure 7:
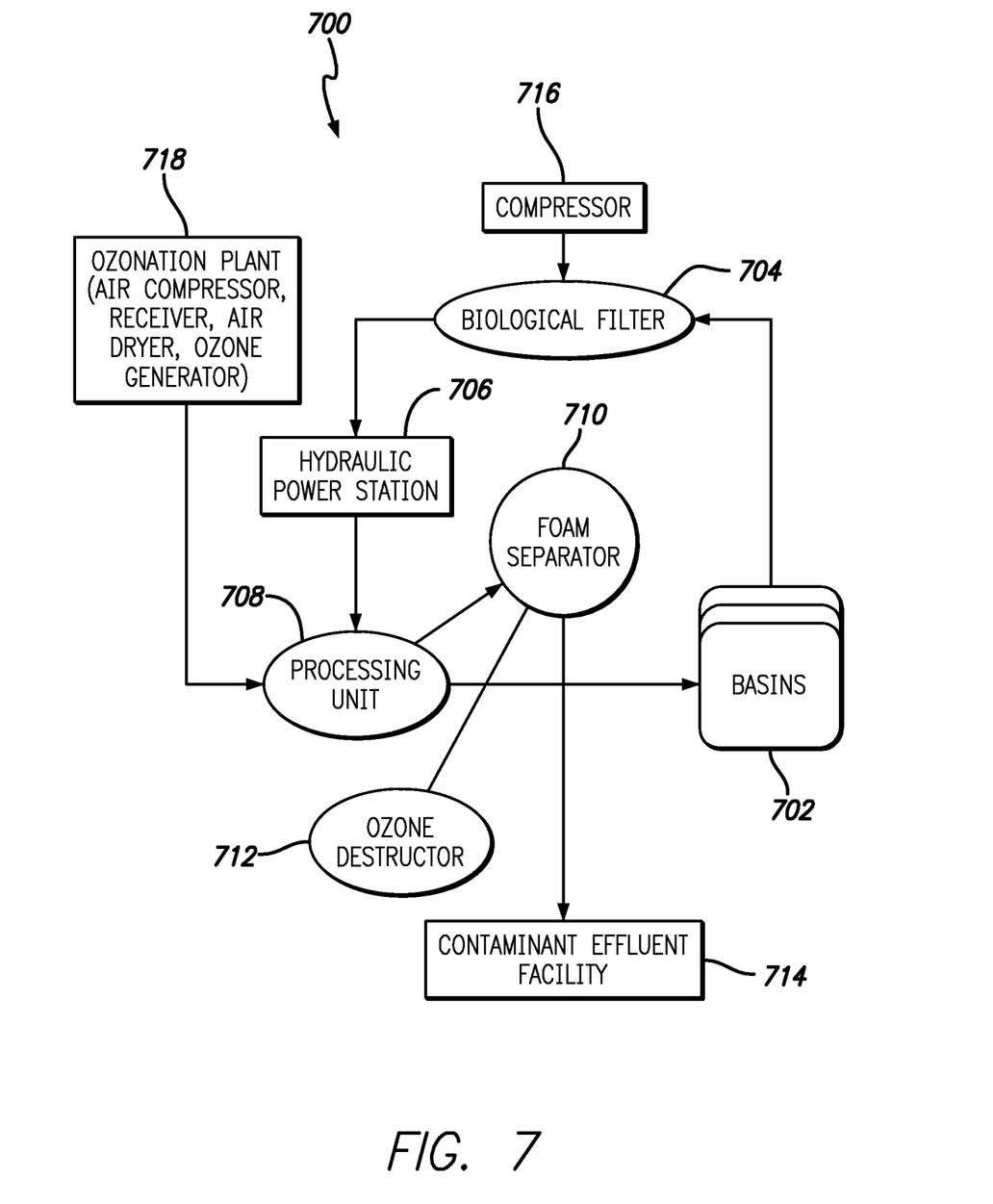
FIG. 7 is a simplified block diagram showing a recirculation aquaculture system according to another embodiment of the invention.

Embodiments of the invention can have various uses for the processing of water including commercial, industrial and residential uses. According to one embodiment water can be processed for aquaculture purposes using the systems and methods previously described. FIG. 7 is a simplified block diagram showing a recirculation aquaculture system 700 according to another embodiment where water from one or more basins 702 is processed in a closed cycle that includes as one component a water processing method and system or unit as described above. The basins 702 are for holding live aquatic animals including, but not limited to, fish. Basin water (i.e., contaminated water) is fed under the influence of gravity from the basins 702 to a biological filter 704 where the basin water is pre-processed to produce partially treated water. Biological filters are known components that basically use living organisms (e.g., bacteria) to biologically degrade pollutants. The process converts ammonia to nitrate. Because ammonia is toxic, the biological filter converts this to a less toxic form of nitrite and then to an even less toxic form of nitrate.

From the biological filter 704 the partially treated water is gravity fed to a hydraulic power station 706 which in one embodiment is comprised of an accumulator-compensator valve and two pumps which are hydraulically connected in parallel so that one pump can operate while the other serves as a back-up pump. The hydraulic power station 706 provides sufficient water pressure to cause the partially treated water to flow to the top of and into a water processing unit 708 or system, such as for example the system 100 of FIGS. 1-5 as described above. The processing unit 708 processes the partially treated water (such as for example processing it as described above in connection with FIGS. 1-5 or FIG. 6) using ozone to generate higher quality water and a waste byproduct. The higher quality water is then gravity fed from the processing unit 708 back to the basins 702.

As previously mentioned, as the partially treated water is processed waste byproduct is generated. It is comprised of a concentrated contaminant embedded within a foam substance. The foam is fed to foam separator 710 which is a component that is external to the water processing unit 708. The foam separator 710 disintegrates or breaks down the foam into a liquid contaminant and unreacted ozone. The unreacted ozone is fed to an ozone destructor 712 and the liquid contaminant is dumped from the foam separator 710 to an effluent facility 714.

The aquaculture system 700 further includes a compressor 716 or similar unit for providing pressurized air to the biological filter 704 for bacteria life support as part of the filter's operation. Also included is an ozonation plant 718 which provides the ozone gas mixture to the processing unit 708.

The ozonation plant includes an ozone generator, air compressor, receiver and air dryer.

Figure 8:
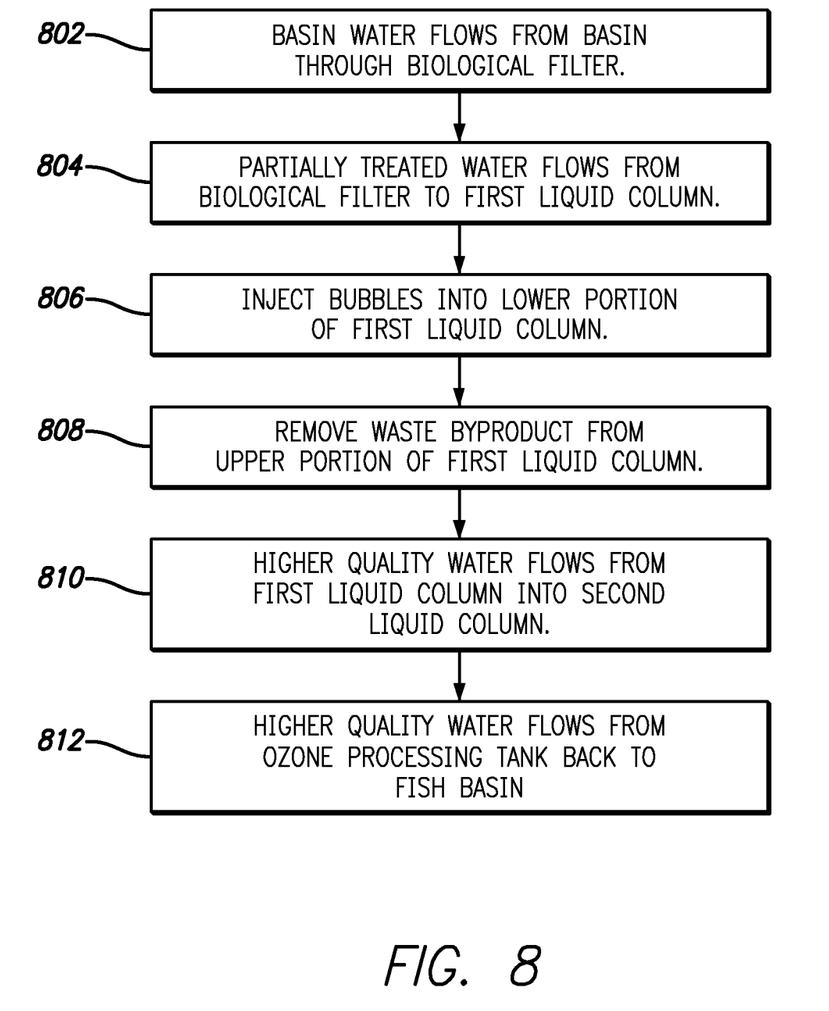
FIG. 8 is a simplified process flow diagram of a method of processing water for use in aquaculture according to another embodiment of the invention.

FIG. 8 is a simplified process flow diagram of a method of processing water for use in aquaculture. Basin water is caused to flow from at least one basin containing one or more fish or other animals to and through a biological filter unit thereby producing partially treated water. (Step 802) The partially treated water is moved from the biological filter unit into an upper portion of a first liquid column contained within an ozone processing unit or tank so that the partially treated water flows downward in the first liquid column.

(Step 804) The first liquid column has a height that is between about 3 meters and about 7 meters. In an alternative embodiment however it has a height that is between about 5 meters and about 6 meters. Bubbles are injected into a lower portion of the first liquid column so that they flow upward and so that the partially treated water flows counter to the flow of the bubbles. (Step 806) While in the first liquid column the partially treated water flows into contact with the bubbles and thereby generates higher quality water and a waste byproduct. The bubbles are a gas comprising ozone and have a diameter between about 0.5 mm and about 3 mm. In an alternative embodiment however the bubbles have a diameter between about 1.8 mm and about 2.2 mm.

The waste byproduct is removed from the first liquid column at the upper portion of the first liquid column. (Step 808) The higher quality water is caused to flow from the lower portion of the first liquid column into a lower portion of a second liquid column and to flow upward within the second liquid column which also is contained within the ozone processing tank. (Step 810) The second liquid column has a height that is between about 3 meters and about 7 meters. In an alternative embodiment however it has a height that is between about 5 meters and about 6 meters. The higher quality water is removed from the second liquid column and caused to flow from the ozone processing tank back to the fish basin. (Step 812)

In an alternative embodiment the basin water flows from the fish basin to the biological filter unit under the influence of gravity (i.e., gravity fed). Similarly the higher quality water is gravity fed as it flows from the ozone processing tank to the fish basin.

According to another alternative embodiment there is no water treatment by electromagnetic radiation (including no treatment by ultraviolet light) and no treatment by any solid catalyst:
(a) of the basin water as it flows from the fish basin to the biological filter, or
(b) of the partially treated water as it flows between the biological filter and the ozone processing tank, or
(c) of the partially treated water and the higher quality water flow as these types of water flow within the ozone processing tank, or
(d) of the higher quality water as it flows between the ozone processing tank back to the fish basin.

According to yet another embodiment, upon leaving the biological filter the partially treated water includes about 20 milligrams per liter of suspended solids, about 4 milligrams per liter of dissolved oxygen, about 15 milligrams per liter of permanganate oxygen consumed and about 0.2 milligrams per liter of nitrites. Upon leaving the ozone processing tank the higher quality water includes about 5 milligrams per liter of suspended solids, about 8 milligrams per liter of dissolved oxygen, about 5 milligrams per liter of permanganate oxygen consumed and about 0.01 milligrams per liter of nitrites.

In view of the above, it will be appreciated that certain embodiments of the invention overcome many of the longstanding problems in the art by providing a system and method for processing impure water by the separation and removal of certain contaminants and further purification of the water using ozone. According to one embodiment, a gas comprised of ozone and air is injected into the impure water. The gas is converted to bubbles which are used as a flotation reagent while the ozone portion of the gas provides for the disinfection and deodorization of the liquid. The impure water is constantly supplied into an upper portion of a working volume or column of fluid contained within a processing unit. At the same time, the gas is supplied into the bottom part of the same fluid column through one or more diffusers. Due to their porosity the diffusers generate the bubbles of this ozone-based gas so that each bubble has a predetermined size.

While the description above refers to particular embodiments of the present invention, it will be understood that many modifications may be made without departing from the spirit thereof. The claims are intended to cover such modifications as would fall within the true scope and spirit of the present invention. The presently disclosed embodiments are therefore to be considered in all respects as illustrative and not restrictive, the scope of the invention being indicated by the claims rather than the foregoing description, and all changes which come within the meaning and range of equivalency of the claims are therefore intended to be embraced therein.

What is claimed is:

1. A system for the processing of impure water using a first liquid column and a second liquid column and using bubbles in the first liquid column to generate treated water and a waste byproduct, wherein the bubbles are a gas comprising ozone, the system comprising:

a first chamber, a second chamber and at least one diffuser,
wherein the first chamber has a first chamber upper end, a first chamber lower end, a first chamber inlet disposed at the first chamber upper end, a first chamber outlet disposed at the first chamber upper end, and a first chamber wall;
wherein the second chamber has a second chamber upper end, a second chamber lower end, and a second chamber outlet;
wherein the first chamber wall substantially surrounds the second chamber and is spaced apart from the second chamber and is configured to contain the first liquid column between the first chamber wall and the second chamber,
wherein the second chamber is configured to contain the second liquid column within the second chamber,
wherein the first chamber inlet is configured to allow the impure water to flow into the first chamber,
wherein the at least one diffuser is disposed at the first chamber lower end and configured to generate the bubbles in the first liquid column,
wherein the first chamber and the at least one diffuser are further configured to cause the bubbles to flow upward in the first liquid column and to cause the impure water to flow downward in the first liquid column so that the impure water flows counter to the flow of the bubbles and into contact with the bubbles and thereby generate the treated water and the waste byproduct,
wherein the first chamber outlet includes a plurality of conduits that are connected to a common discharge header,
wherein the first chamber and the second chamber are configured to be in fluid communication so that the treated water can flow from the first chamber lower end into the second chamber lower end, and wherein the second chamber is configured so that the treated water can flow upward from the second chamber lower end and out of the second chamber via the second chamber outlet.

2. The system of claim 1 wherein the second chamber outlet is disposed at the second chamber upper end.

3. The system of claim 1 wherein the first liquid column has a first column upper end and a first column lower end,
wherein the first chamber inlet is configured to allow the impure water to flow into the first chamber and to fall onto the first liquid column at the first column upper end.

4. The system of claim 1 wherein the second liquid column has a second column upper end, a second column lower end, and a free surface disposed at the second column upper end,
wherein the second chamber outlet comprises a sluice gate having a movable barrier,
wherein the movable barrier has an upper edge and a lower edge, and
wherein the sluice gate is configured to move the upper edge of the movable barrier to allow the treated water to flow from the free surface of the second liquid column over the upper edge and out of the second chamber.

5. The system of claim 1 wherein the second chamber has a second chamber wall configured to separate the first liquid column and the second liquid column, and
wherein the second chamber wall defines a plurality of ports disposed at the second chamber lower end, and
wherein the first chamber and the second chamber are configured to be in fluid communication with one another via the plurality of ports.

6. The system of claim 1 wherein the at least one diffuser is comprised of a plurality of coplanar diffusers disposed generally uniformly at the first chamber lower end.

7. The system of claim 6 wherein each of the plurality of diffusers is configured to generate bubbles having a diameter between about 0.5 mm and about 3 mm.

8. The system of claim 7 wherein each of the plurality of diffusers is configured to generate bubbles having a diameter between about 1.8 mm and about 2.2 mm.

9. The system of claim 1 wherein the first liquid column and the second liquid column are each of a height that is between about 3 meters and about 7 meters.

10. The system of claim 9 wherein the first liquid column and the second liquid column are each of a height that is between about 5 meters and about 6 meters.

11. The system of claim 9 wherein the first chamber, the second chamber and the at least one diffuser are configured to generate the treated water at a rate of about 550 cubic meters per hour ($m^3$/hr).

12. The system of claim 9 wherein the bubbles are a gas comprised of ozone and air, and wherein the at least one diffuser is further configured to generate the bubbles in the first liquid column at a rate of about 150 cubic meters of the gas per hour ($m^3$/hr).

13. The system of claim 1 wherein the first chamber and the second chamber each have a generally cylindrical shape, wherein the first chamber has an inner diameter of a length that is between about 3 meters and about 8 meters, and wherein the second chamber has an inner diameter of a length that is between about 2 meters and 7.8 meters.

14. The system of claim 13 wherein the inner diameter of the first chamber is about 5 meters, and wherein the inner diameter of the second chamber is about 3.5 meters.

15. The system of claim 1 wherein first and second chambers are configured so that the treated water and the impure water are not treated by any one of an electromagnetic radiation and a solid catalyst as the impure water and the treated water flow within the first chamber and as the treated water flows within the second chamber.

16. A system for the processing of impure water using a first liquid column and a second liquid column and using bubbles in the first liquid column to generate treated water and a waste byproduct, wherein the bubbles are a gas comprising ozone, the system comprising:
a first chamber, a second chamber and at least one diffuser,
wherein the first chamber has a first chamber upper end, a first chamber lower end, a first chamber inlet disposed at the first chamber upper end, a first chamber outlet disposed at the first chamber upper end, and a first chamber wall;
wherein the second chamber has a second chamber upper end, a second chamber lower end, and a second chamber outlet;
wherein the first chamber wall substantially surrounds the second chamber and is spaced apart from the second chamber and is configured to contain the first liquid column between the first chamber wall and the second chamber,
wherein the second chamber is configured to contain the second liquid column within the second chamber,
wherein the first chamber inlet is configured to allow the impure water to flow into the first chamber,
wherein the at least one diffuser is disposed at the first chamber lower end and configured to generate the bubbles in the first liquid column,
wherein the first chamber and the at least one diffuser are further configured to cause the bubbles to flow upward in the first liquid column and to cause the impure water to flow downward in the first liquid column so that the impure water flows counter to the flow of the bubbles and into contact with the bubbles and thereby generate the treated water and the waste byproduct,
wherein the first chamber outlet is configured to allow the waste byproduct to flow out of the first chamber,
wherein the first chamber and the second chamber are configured to be in fluid communication so that the treated water can flow from the first chamber lower end into the second chamber lower end,
wherein the second chamber is configured so that the treated water can flow upward from the second chamber lower end and out of the second chamber via the second chamber outlet,
wherein the first chamber has a first chamber middle portion disposed between the first chamber upper end and the first chamber lower end, and
wherein the first chamber further comprises a plurality of baffles extending from the first chamber wall to the second chamber and further extending vertically from the first chamber upper end and terminating at the first chamber middle portion thereby defining a plurality of vertical channels in a portion of the first chamber.

17. The system of claim 16 wherein the first liquid column has a first column upper end and a first column lower end,
wherein the first chamber outlet is comprised of a plurality of covers disposed above the first liquid column,
wherein the plurality of covers is further disposed above the plurality of channels so that each one of the plurality of covers is disposed above a corresponding one of the plurality of channels,
wherein each of the plurality of covers is vault-shaped and has an apex,
wherein the first chamber outlet is further comprised of a plurality of conduits, wherein each one of the plurality of conduits extends from a corresponding one of the plurality of covers at the apex, and wherein the plurality of covers are configured to permit the waste byproduct to flow from the first liquid column and into the plurality of conduits.

18. A system for the processing of impure water using a first liquid column and a second liquid column and using bubbles in the first liquid column to generate treated water and a waste byproduct, wherein the bubbles are a gas comprising ozone, the system comprising:

means for introducing the impure water into the first liquid column so that the impure water flows downward in the first liquid column;

means for injecting bubbles into the first liquid column so that the bubbles flow upward and the impure water flows counter to the flow of the bubbles and into contact with the bubbles and thereby generates the treated water and the waste byproduct;

means for removing the waste byproduct from the first liquid column;

means for causing the treated water to flow from the first liquid column into the second liquid column and to flow upward within the second liquid column; and means for removing the treated water from the second liquid column, wherein the means for removing the waste byproduct from the first liquid column includes a plurality of conduits that are connected to a common discharge header.

19. The system of claim 18 wherein the first liquid column and the second liquid column are each of a height that is between about 3 meters and about 7 meters, and wherein bubbles have a diameter between about 0.5 mm and about 3.0 mm.

20. The system of claim 18 wherein the first liquid column and the second liquid column are each of a height that is between about 5 meters and about 6 meters and wherein bubbles have a diameter between about 1.8 mm and about 2.2 mm.

* * * * *